E. E. FITZGERALD.
RESAWING MILL.
APPLICATION FILED OCT. 26, 1915.

1,252,894.

Patented Jan. 8, 1918.
9 SHEETS—SHEET 1.

Fig. 1.

Inventor:
Edward E. Fitzgerald,
By Dodge & Sons,
Attorneys.

E. E. FITZGERALD.
RESAWING MILL.
APPLICATION FILED OCT. 26, 1915.

1,252,894.

Patented Jan. 8, 1918.
9 SHEETS—SHEET 2.

E. E. FITZGERALD.
RESAWING MILL.
APPLICATION FILED OCT. 26, 1915.

1,252,894.

Patented Jan. 8, 1918.
9 SHEETS—SHEET 3.

E. E. FITZGERALD.
RESAWING MILL.
APPLICATION FILED OCT. 26, 1915.

1,252,894.

Patented Jan. 8, 1918.
9 SHEETS—SHEET 5.

E. E. FITZGERALD.
RESAWING MILL.
APPLICATION FILED OCT. 26, 1915.

1,252,894.

Patented Jan. 8, 1918.
9 SHEETS—SHEET 6.

Inventor:
Edward E. Fitzgerald
By Dodge & Sons
Attorneys.

UNITED STATES PATENT OFFICE.

EDWARD E. FITZGERALD, OF MINDEN, LOUISIANA.

RESAWING-MILL.

1,252,894.　　　Specification of Letters Patent.　　Patented Jan. 8, 1918.

Application filed October 26, 1915.  Serial No. 58,033.

*To all whom it may concern:*

Be it known that I, EDWARD E. FITZGERALD, a citizen of the United States, residing at Minden, in the parish of Webster and State of Louisiana, have invented a certain new and useful Improvement in Resawing-Mills, of which the following is a specification.

This invention pertains to machines for sawing lumber, and consists in a duplex resawing organization, designed to do cant sawing, quarter sawing, or both, and to saw planks and boards from cants or log sections of various form in transverse section, rectangular, semicircular, quadrantal, sector shaped, or segmental, as well as from the common form of cant prepared in the log mill, and in which three sides are sawed perpendicular to one another, and the fourth is left in its original rounding form, or all four sides are sawed.

The organization comprises two saws or sawing machines, or two sets or groups of such saws or machines, arranged to operate simultaneously upon different cants or log sections, each saw or set of saws being capable of doing, at the will of the attendant, either cant sawing or quarter sawing; in other words, the several saws or groups may simultaneously produce the same class of sawed lumber, or different classes, as desired.

Each saw or group of saws is mounted in an adjustable husk or framework, and is movable relatively to its own set of log-feeding rolls, cant turners, and other devices necessary to proper handling of the cant or log sections, such adjustment of the saws permitting the thickness of the sawed planks or boards to be determined and varied as desired.

Either circular saws or band saws may be employed, or a circular saw or saws may be used in connection with one set of log-feeding devices and a band saw or saws with the other set. So too, provision may be made for effecting relative adjustment of the individual saws of each set, so as to vary the thickness, or the relative thicknesses of the several boards or planks simultaneously cut by the saws of one set or group.

Sawing machines, both band and circular, employing a plurality of saws, and provided with means for independently and relatively adjusting the saw blades or disks, are well known in the art, and it is hence unnecessary to show or describe the same in detail; but it is to be understood that where in this description reference is made to a saw or to a sawing machine, such terms are intended to include or comprehend a single saw or a plurality of saws, band or circular, carried in a common frame, husk or mounting, and capable of bodily adjustment relatively to the runway over which the log cants or sections are moved by the feeding devices.

The two log runways or beds are arranged parallel one to the other, but the feed rolls are so rotated as to traverse the logs or cants in an opposite direction on one runway from their travel on the other.

Between the two runways or feeding beds are two sets of transfer devices, whereby a cant or log section after passing and being operated upon by one saw or set of saws, is carried to the feed bed or runway of the other saw or set of saws, and moved past such saws or saws, then again transferred to the first runway or feeding bed and operated upon, and so on until the cant or log section is completely reduced to lumber of the desired form or forms.

A practical embodiment of the invention as used by me, is illustrated in the accompanying drawings, wherein.

To avoid confusion, parts are omitted in some of the figures but are shown in others; but it is of course to be understood that the various parts are all present in the one structure, except the alternative forms of the cant turner.

Figure 1:
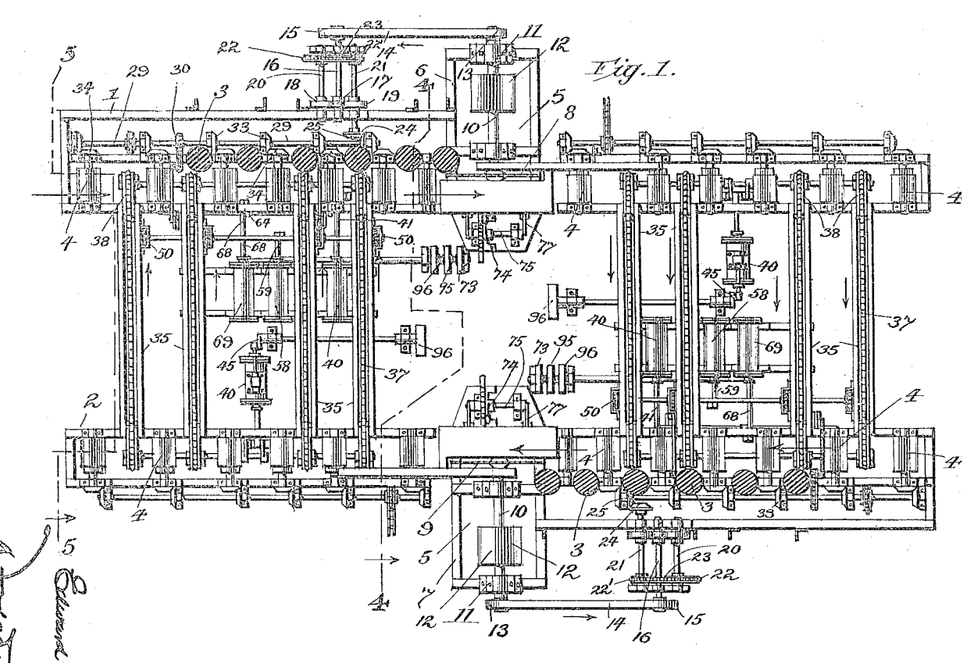
Figure 1 is a plan view of the apparatus, showing the vertical feed rolls in section, and omitting all parts above the horizontal plane on which such section is taken.

In these drawings, and referring first to Fig. 1, which best shows the general framework and the location and arrangement of the feeding beds or runways, saws, and intermediate transfer skids and devices, 1 and 2 indicate two parallel log beds or runways built into a general framework preferably of structural steel, and provided with vertical rolls 3, and horizontal rolls 4, to which rotary motion is imparted by appropriate gearing. The vertical rolls 3 are used only on the infeeding section of each runway or bed; the horizontal rolls throughout the entire length thereof.

Figure 2:
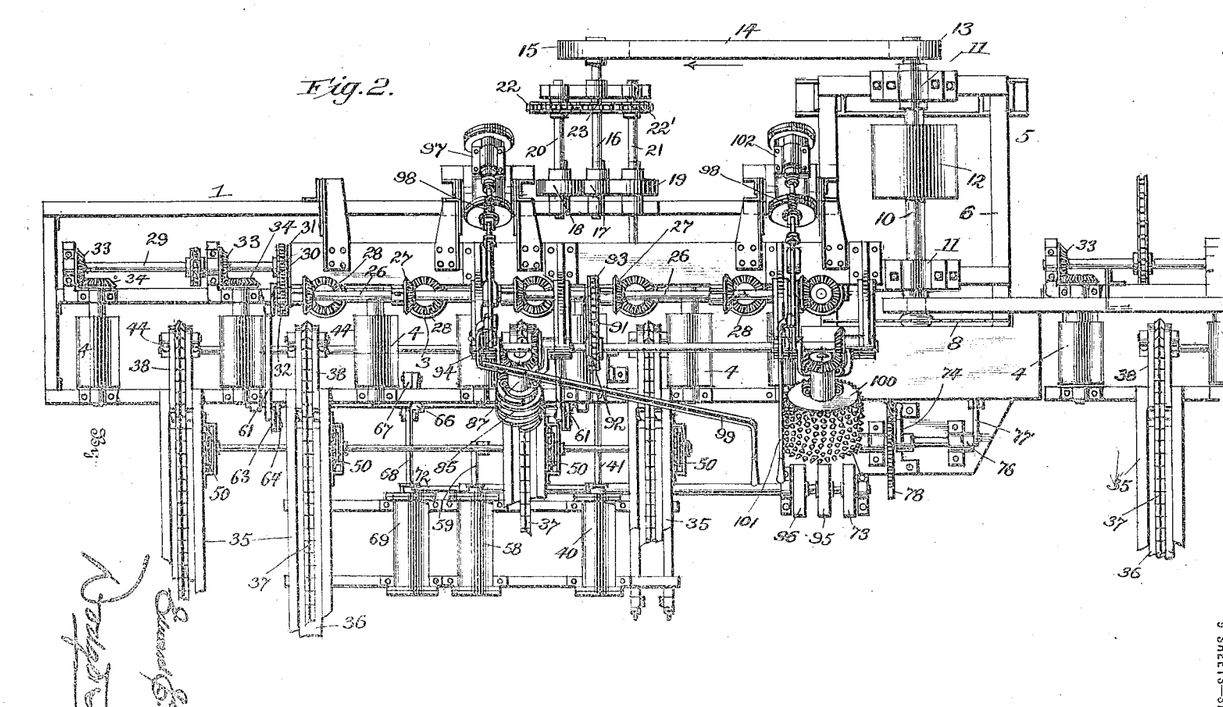
Fig. 2, is a plan view of the upper left hand quarter of the structure shown in Fig. 1, but with all the parts shown in place.

At or about the midlength of each bed or runway 1 and 2 is arranged a suitable bed or base 5, on which base are mounted respectively, frames or husks 6 and 7 of sawing machines 8 and 9, each movable a short distance in a direction perpendicular to the length of the proximate cant-feeding bed or runway. These sawing machines are here represented in their simplest form as single-saw circular machines. Each bed 5 is preferably furnished with rollers at the points where the husk 6 or 7 rests thereon, and with clips or guide pieces to maintain the husk in proper relation to the support and to guide it in its movements back and forth. Each sawing machine comprises a saw arbor 10 journaled in suitable boxes or bearings 11, and provided with a wide belt pulley 12 to receive motion from any convenient prime motor. Each arbor is, under the arrangement here illustrated, and as shown in Fig. 2, provided also with a belt pulley 13 from which motion is imparted by a belt 14 to a band wheel 15 of a shaft 16 carrying a friction wheel 17, advisably of paper, which gives motion to either of two metal friction wheels 18 and 19, according to adjustment. Wheels 18 and 19 are carried by shafts 20, 21 provided with sprocket wheels 22 and 22', and are caused to rotate in unison by a chain belt 23 passing around said wheels. The wheels 22 and 22' are of different diameters, hence as driving friction is established through one or the other wheel 18 or 19, the feed rolls which are thereby controlled and driven will be given a lower or higher speed as required. Either the intermediate wheel 17 or the two outer wheels 18, 19, may be made slightly movable laterally to establish driving relation through one or the other of the wheels 22, 22', as is well understood in this art, and hence not illustrated as to common details of adjustment.

Shaft 21 carries a bevel gear-wheel 24, which meshes with and rotates a like gear 25, fixed upon a line shaft 29 carrying also a series of bevel gears 33, each meshing with a similar gear 34 carried by the shaft of one or another of the horizontal feed rolls 4. In this way all of the horizontal rolls are driven in the same direction and at like speed.

Above, but parallel with shaft 29, is a similar shaft 26 to which rotary motion is imparted by a chain or belt 30, passing about sprocket wheels or pulleys 31, 32 secured upon the respective shafts, both of which are of course carried in suitable boxes or bearings on the general framework of the structure.

Shaft 26 carries a series of bevel gear wheels 27, each meshing with a similar gear 28, of which latter there is one carried by the shaft or journal of each vertical feed roll 3, as shown in Figs. 2, 3, 4 and 5. The gear wheels and chain wheels being in pairs of equal diameter, and the rolls 3 and 4 being likewise of equal diameter, all of said rolls will have like surface speed.

Between the two beds or runways 1 and 2 extend two sets of skids or cross beams 35, preferably formed of channel bars, arranged in pairs, with their channeled faces turned outward. Riveted or otherwise secured to the opposed vertical inner faces of the two beams are channel bars 36, the horizontal webs of which are somewhat below but parallel with the upper longitudinal edges or flanges of the beams 35, and serve as runways or supports for transfer chains 37, shown in Figs. 1 to 5. The chains 37 are of well known type, the links being beveled on their upper surfaces each way from a medial longitudinal line. The apices of the chain links rise above the beams or skids 35, and form the supporting surface on which the cants or log sections rest and by which they are held clear of said beams or skids.

The cants or log sections resting upon the links will be carried forward as the chains advance, so long as their movement is not impeded by any stop or obstruction, but upon the application of slight retarding force, or interposition of a stop of any kind, they will be held stationary, while the chains continue their forward movement, the narrow bearing line of the links permitting them to move beneath the cants with relatively small frictional resistance, and hence with the expenditure of a comparatively small amount of force. This is advantageous in that it permits the chains to travel continuously or without repeated stopping and starting, and without undue waste of power, and enables a simple stop and trip device to control the delivery of cants or log sections from the skids to the feeding beds or runways.

The skids or beams 35 extend to and rest at each end upon the longitudinal frame members which support the proximate ends of the horizontal feed rolls, as shown in Figs. 1, 2, 4 and 5. To enable the chains 37 to take the cants or log sections from the skids or from one set of feed rolls 4, and to deliver them upon the opposite set when required, yet be kept normally out of the way of cants on the feed rolls 4, each skid or beam 35 is provided with a hinged or pivoted extension 38, best shown in Fig. 5, and each such extension is furnished with means for raising it to and dropping it below the plane of the upper sides of feed rolls 4. These devices will be understood upon referring to Figs. 1, 2 and 5. As seen in the first two figures, each extension 38 is pivoted at one end to the two beams or members of a skid 35, lies between said beams, and projects beyond the same into the space between two of the horizontal feed rolls 4. Each extension carries at its free end a sprocket or chain wheel 39 of such diameter that when the extension is raised to horizontal position the chain 37 will have the apices of its links slightly above the plane of the bed formed by the rolls 4, so that the cants or log sections may be carried over and clear of the rolls, and then deposited thereon through lowering of the extensions 38.

The elevation and depression of the extensions may be effected by any suitable lever mechanism, operated by hand or foot in a manner common to similar mill parts; but it is preferred in practice to provide for fluid pressure actuation in order to simplify the duties and lessen the labor of the sawyers. Such means I have illustrated in Fig. 5, wherein 40 indicates a cylinder, adapted to receive compressed air, steam, or other pressure fluid, and containing a piston, the rod 41 of which is pivotally connected with the upstanding arm of an elbow-lever 42, the horizontal arms of which carry a long rod or bar 43 connected by links 44 with the free ends of the extension members 38 of one group or set of skids. The cylinder is provided with a valve shell or casing and a three-way valve of any usual or convenient type, as the common D slide valve, cylindrical slide valve, or rotary three-way cock, by which pressure fluid may be admitted to the cylinder at either side of the piston, and simultaneously released from the other side. The stem or rod 44 of the valve is connected with the upper end of a lever 45, by a pin passing through a slot in said lever, or in equivalent way, and the lever is provided with a pedal by which to rock or swing it to either side of its pivot or fulcrum and so shift the valve. In practice, pressure is kept constantly on one or the other side of the piston to hold the skid extensions in one or the other position, and to prevent accidental interference of the extensions and carrying chains with a cant when such is in position on the feed rolls.

Continuous travel is imparted to the several chains 37 by sprocket wheels 46, carried by a shaft 47, idler pulleys 48 carried by a second and parallel shaft 49, serving to cause the chains to wrap adequately about the sprocket wheels to maintain proper driving engagement.

The skids 35 are of a length to receive a number of cants or log sections, which are released one at a time, the first one released being delivered at the rear of the series after making its travel past the two saws or groups of saws.

Figure 12:
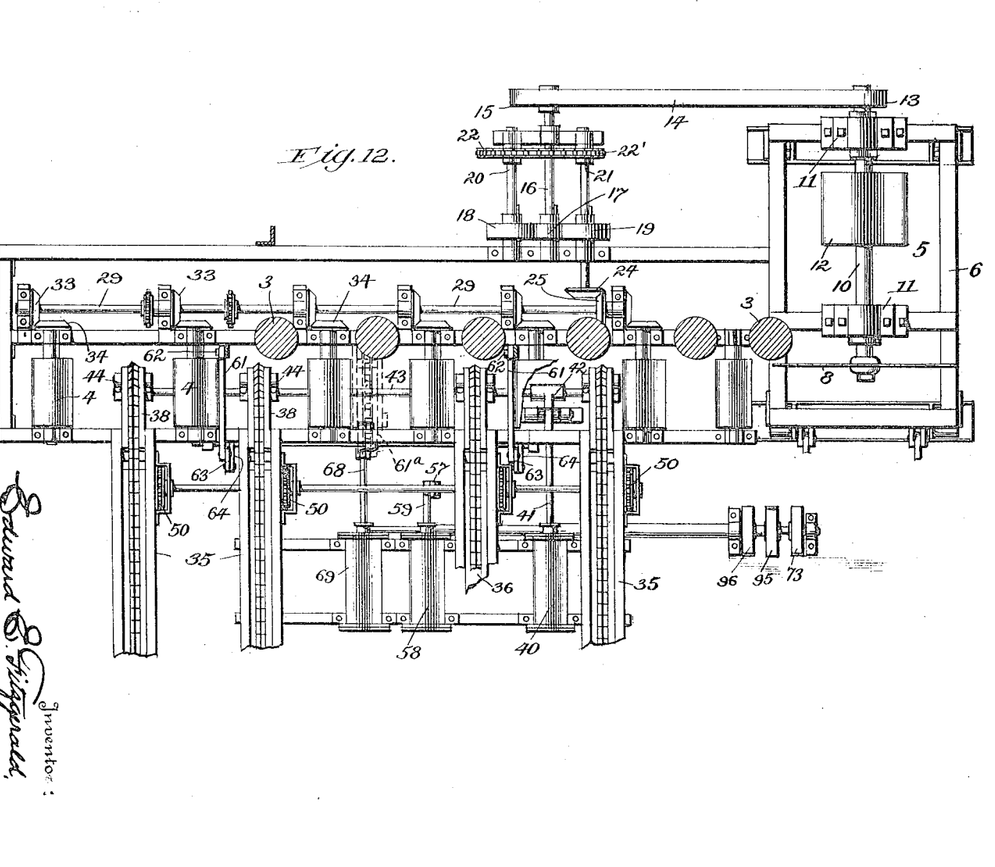
Fig. 12, a plan view showing the location and arrangement of the fluid pressure cylinders associated respectively with the skid lift, the trip devices and the cant turner, and showing also the pedals or levers controlling the valves of said cylinders, and the friction gear by which the feed rolls are driven at variable speeds.
Figure 13:
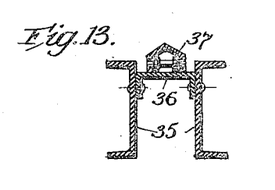
Fig. 13, a transverse sectional view of one of the transfer platforms or skids, showing one of the transfer chains in position.
Figure 14:
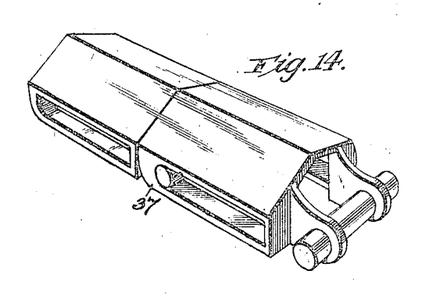
Fig. 14, a perspective view of two connected chain links suitable for the transfer belts or chains.
Figure 15:
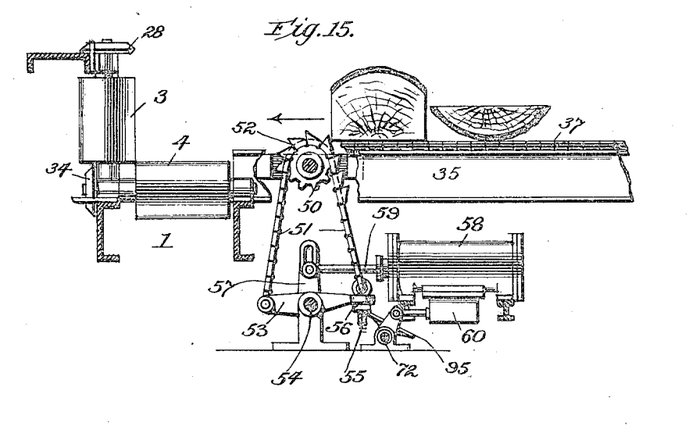
Fig. 15, an elevation of the stop or trip device by which the reserve cants or log sections are normally held against advance upon the skids, but which, when operated causes the forward cant or section to pass to the feed rolls.

To prevent the release of the foremost cant and hold back the others, there is provided a stop and trip mechanism, shown in Fig. 15, two or more such devices being employed at each transfer point, but arranged to operate in unison. As seen in Figs. 1, 2 and 12, sprocket wheels 50 are mounted to turn upon axles or upon journals at one side of each of the double skids or beams 35 of the two transfer beds, with their peripheries standing somewhat above the beams. (See Fig. 15.) Over these sprocket wheels are carried chains 51, armed with spurs or pointed teeth 52 of substantially saw-tooth form. Each chain has its ends made fast to the ends of a horizontal lever 53, the several levers being keyed or otherwise firmly secured upon a rock-shaft 54, Figs. 12 and 15. A threaded eyebolt 55 and nut 56 serve to tighten each chain 51. Rock-shaft 54 is carried in suitable bearings and is provided with a radial arm 57, to which power is applied to rock the shaft and its lever 53, and thereby to cause the several chains 51 to move about the sprocket wheels 50. As the foremost cant or log section on the skids is constantly urged forward by carrying chains 37, it will press against but will be held back by the chains 51, so long as the latter remain at rest. When, however, rockshaft 54 is turned in a forward direction the several chains 51 will move upward on the side against which the cant bears, and the rising teeth or spurs will engage the underside of the cant, lifting it above the sprocket wheels, and, through successive engagement of following spurs or teeth and their movement over the sprocket wheels, carrying the cant over the same and depositing it upon the horizontal feed rolls 4.

As soon as a cant is thus released and moved forward the rockshaft is turned backward, causing the long back faces of the teeth or spurs to press against and slightly force back the then foremost cant which will in turn press back the others. The rockshaft is then held at rest, and the chains form stops to hold the cants upon the skids against forward movement, until it becomes desirable to advance another cant, when the described operation is repeated.

To operate the rock shaft there is provided a cylinder 58 containing a piston, the rod or stem 59 of which is connected with the arm or lever 57 of the rockshaft. This cylinder is provided, as are all the power cylinders herein referred to, with a valve shell as 60, containing any appropriate type of three-way valve, to supply pressure fluid to the cylinder at either side of the contained piston, as is well understood in this art. Cylinder 58, and others to be noted, are conveniently mounted in a framing beneath the skids, though obviously they may be placed in any convenient positions and supported in any convenient way.

In order properly to position the cants as they are successively delivered upon the feed rolls 4, cant-turning devices are provided. These may be in either of the two substantially equivalent forms illustrated respectively in Figs. 6, 7 and 8, and in Figs. 9, 10, and by dotted lines in Fig. 12.

Figure 6:
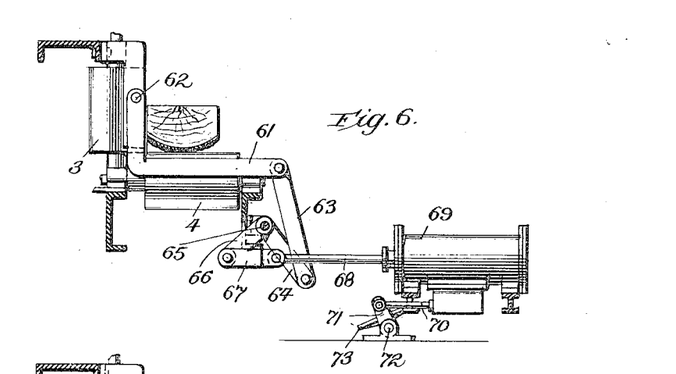
Figs. 6, 7 and 8, views of the double-armed cant turner preferably employed for the first handling of the cants, showing the same in depressed and in elevated position, and in plan.
Figures 7, 8:
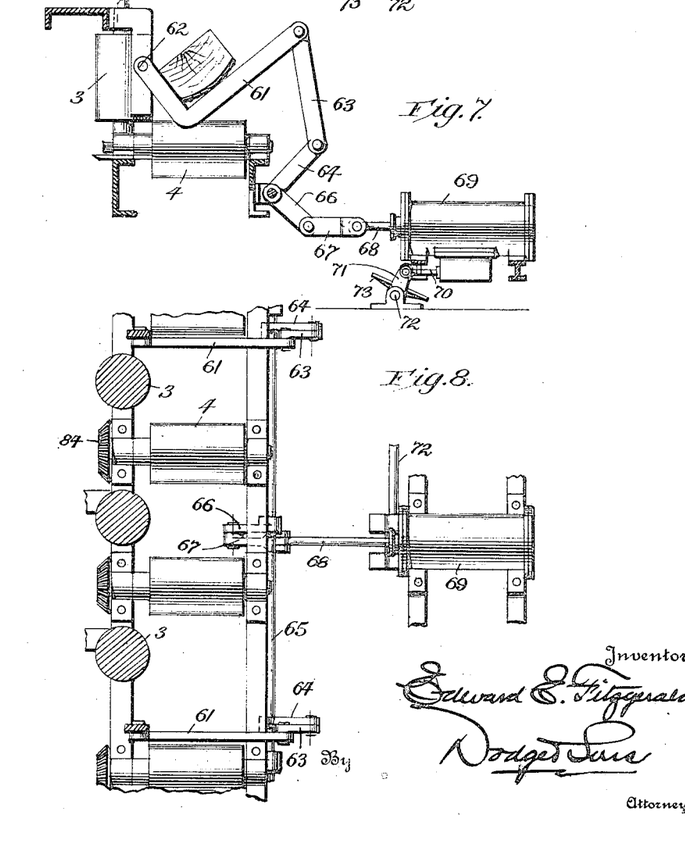

Referring first to Figs. 6, 7 and 8, the cant turner will be seen to consist of two substantially L-shaped bars 61, the lower horizontal arm of each of which lies normally between two of the horizontal feed rolls 4, while the upright arm is pivotally supported by or suspended from a bolt 62 at its upper end, passing into the framing which carries the boxes or bearings of feed rolls 3, 4. The free end of the horizontal arm of each bar 61 is connected by a link 63 with an arm 64 projecting radially from a rockshaft 65, journaled in boxes or bearings carried by the general framing of the apparatus. As seen in Fig. 8, there are two such arms 64 carried by rockshaft 65, one for each bar 61, and between said arms is a third arm 66, set at an angle to arms 64, and connected by a link 67 to the rod 68 of a piston contained within a cylinder 69. Cylinder 69 is provided with the usual valve chest or casing and three-way valve, the stem 70 of which valve is connected with an arm 71 carried by and radial to a rockshaft 72, mounted to turn in suitable boxes, and provided with a pedal or actuating lever 73, located near the sawyer's stand, as shown in Fig. 12. As shown in Figs. 1, 2, 12, three such pedals 73, 95, 96, are grouped side by side, at or near the sawyer's stand, controlling respectively the valves of cylinders 69, 58 and 40, as later explained. Directly in front of the sawyer's stand is arranged a hand lever 74 secured to a rockshaft 75 having radial arms 76, connected by links 77 with the sliding frame or husk of the saw mill 7 or 8, as the case may be, a notched rack or segment 78 being provided by the side of said lever to receive a hand-controlled locking device or detent, which when freed by the operator drops into one or another notch of the segment. The notches are accurately spaced to correspond to the minimum of differences in thickness of lumber to be produced, so that by properly setting the hand lever, the saw or saws may be set just the proper distance forward of the vertical feed rolls 3 to produce lumber of the required thickness. It is to be understood of course that all the parts and devices described are duplicated in the two halves or parts of the duplex resawing plant or apparatus, and hence it will be unnecessary to repeat the description of any of these. In other words, the complete organization comprises two correlated sawing machines, each provided with a bed or skids to hold a number of cants; means for stopping, releasing, and advancing the cants to the feeding beds; means for positioning and for feeding the cants to and from the saws; and power-actuated means for actuating and controlling the various parts and devices.

Figure 9:
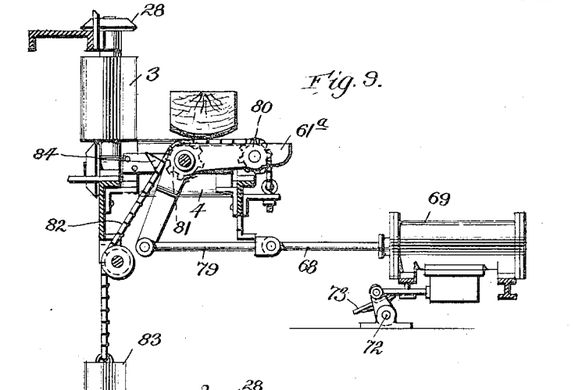
Figs. 9 and 10, views of the single-armed cant turner which may be used in lieu of that shown in Figs. 6, 7 and 8.
Figure 10:
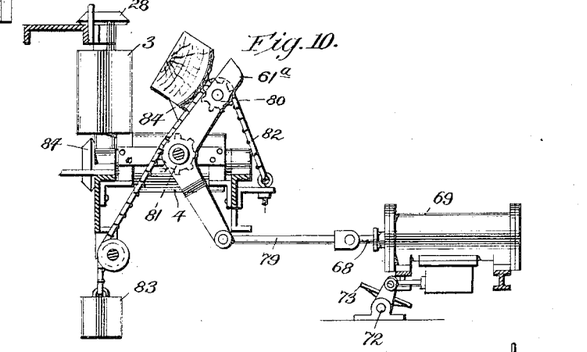
Figure 11:
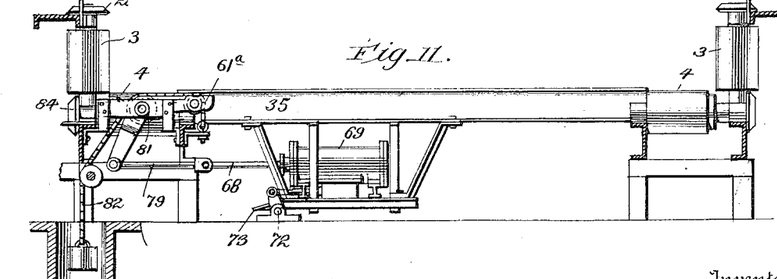
Fig. 11, a transverse sectional view, illustrating the manner of supporting the fluid pressure-cylinders beneath the skids of the transfer mechanism and showing the single-armed cant turner in position.

The alternative form of cant-turner is illustrated in Figs. 9 and 10, its position being indicated by dotted lines in Fig. 12. This consists of an elbow lever 61$^a$, pivotally supported by cross bars of the framing, between two of the horizontal feed rolls 4. The upper horizontal arm or member of the lever 61$^a$ lies normally just below the upper level of the rolls 4, while its other arm extends downward from the first, advisably at an obtuse angle, as shown. Said lower arm is connected by a suitable link or bar 79 with the piston rod 68 of pressure fluid motor 69, which will be the same whichever cant-turner be employed.

Near the outer end of the upper arm of lever 61$^a$, which may conveniently be made of two parallel plates or bars, is located a sprocket wheel or pulley 80, and at its bend or angle, and conveniently mounted upon its pivot pin or bolt is a second sprocket wheel or pulley 81. A chain 82, having one end made fast to the general framework below the upper arm of lever 61ª passes upward over wheel 80, thence to and over wheel 81, and finally downward to a pit or well in the floor of the mill, made to receive a weight 83, with which the lower end of said chain is provided. The chain is provided with a heavy tooth or spur 84, which, when the lever 78 is out of action, stands slightly below the top line of rolls 4, or in the position shown in Fig. 9. When, however the piston of cylinder 69 acts to throw upward the horizontal arm of the lever 61ª, said spur is caused, by the rise of sprocket wheel 80 and elevation of chain 82, to move upward as seen in Fig. 10, in turn moving the cant upward on lever 61ª while it is being bodily raised by said lever. This action continues until the lever reaches a point where the cant so far overhangs the spur or tooth 84 that it falls over against the upright feed rolls 3, thus making, in the case of a cant having as many as three of its faces squared, a quarter turn, as is true also with the first described cant-turning arms.

Figure 3:
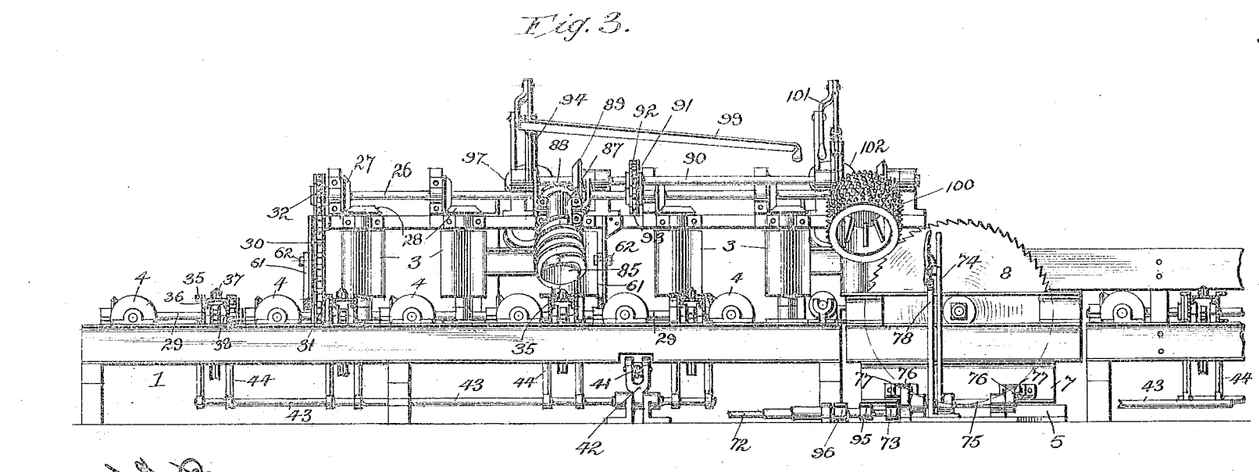
Fig. 3 is an elevation of the same, looking from the lower toward the upper side of Fig. 2.
Figure 4:
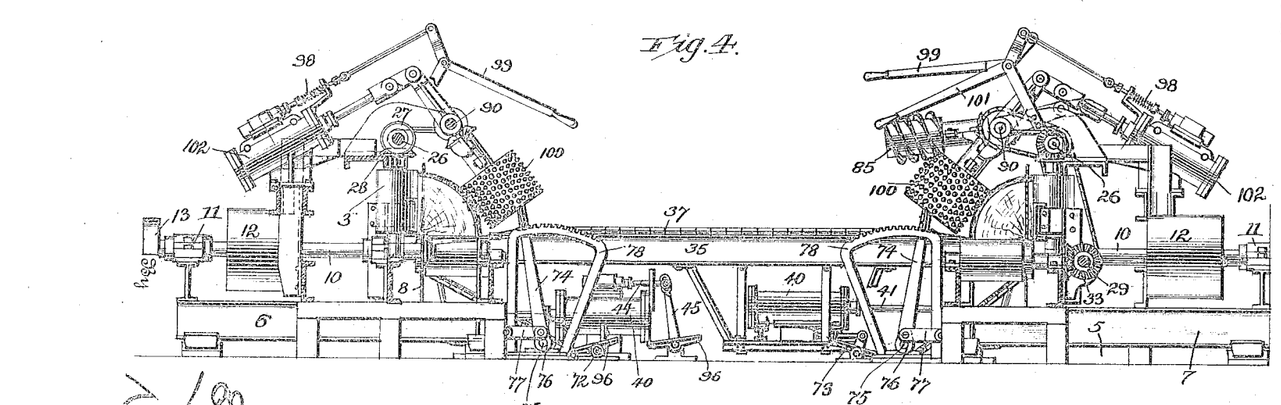
Fig. 4 is a vertical sectional view on the line 4—4 of Fig. 1, but with all parts in place.
Figure 5:
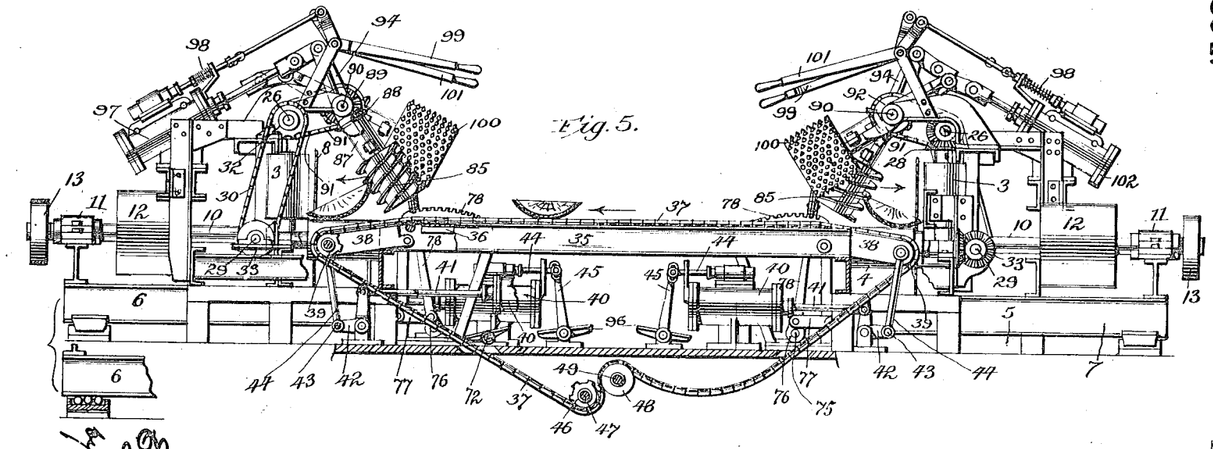
Fig. 5 is a similar sectional view, on the line 5—5 of Fig. 1.

In order to press the cant or log section firmly against the feed rolls, to turn it to any further extent required, there is provided a roll or drum 85, the shaft or axle of which is carried in a swinging sleeve 87, and is furnished with a bevel gear or pinion 88, which meshes with and is rotated by a like gear or pinion 89, mounted upon a shaft 90, driven by a chain belt 91 passing about a sprocket wheel 92 on said shaft, and also about a like sprocket wheel 93 on shaft 26, as shown in Figs. 2, 3 and 5.

The roll or drum thus continuously rotated, is provided on its circumference with a coarse screw thread or helix, which as illustrated in Fig. 5, enables it to engage the edge of a cant or log section, particularly when relatively thin, and to lift the same so as to lay the flat face of the cant squarely and firmly against the vertical feed rolls 3.

To insure proper pressure of the threaded drum 85 against the cant, and consequently of the cant against the feed rolls, both when positioning and later when aiding to advance the cant, the sleeve 87 is provided with an arm 94, to which force is applied by a pressure fluid motor 97, of the same character as motors 40, 58 and 69 above described. The valve of this motor is normally held in position to admit pressure fluid to the lower or outer end of the motor cylinder so that the roll or drum is thrown or urged downward and toward the vertical feed rolls 3, a spring 98, Figs. 2, 4 and 5, or equivalent means, being provided to maintain the valve normally in such position. To elevate the roll or drum to permit a cant or log section to pass beneath it, the valve of motor 97 is reversed, causing pressure fluid to enter on the opposite side of the piston, and to draw the arm 94 downward through its connection therewith, the pinion 88 rolling upon pinion 89, and thus permitting the swinging movement of sleeve 87 without interfering with the rotation of either, though of course momentarily varying the speed of pinion 88. Such shifting of the valve of motor 97 may conveniently be effected by a hand lever 99, which extends to a point near the sawyer's stand, as seen in Figs. 2 and 3. Any suitable intermediate connections may of course be employed between the hand lever 99 and the valve of motor 97.

The drum 85 not only serves to position the cant, but effectively aids in advancing the same to the saw, which office is, however, mainly performed by a second roll or drum 100, mounted, operated and controlled in precisely the same manner as is roll or drum 85.

As shown in Figs. 2, 3, 4 and 5, the drum 100, which is advisably made hollow to reduce the weight, is formed or furnished with sharp points or teeth on its peripheral surface, to enable it better to take hold of and move certainly or advance the cant delivered within its field of operation by the chains 37 and threaded roll or drum 85.

A hand lever 101, reaching to a point near the sawyer's stand, serves to control the pressure fluid valve of the motor 102 by which the position of roll or drum 100 is determined, and its pressure upon the cant regulated or varied.

It is particularly to be noted that both rolls or drums 85 and 100 by reason of swinging downward and inward toward the feed rolls 3 and 4, force and hold a cant or log section firmly against said rolls, and press the same into the angular seat formed by the intersecting planes of the cant-supporting faces of said rolls. In this way adequate pressure and bearing and consequent efficient feeding are insured. The rolls or drums may obviously encircle a solid arm or axle instead of having an axle carried within a sleeve.

It has been noted above that the several pedals and hand levers controlling the valves of the pressure fluid motors of each sawing machine, as also the lever for shifting the latter, are grouped in position to be readily accessible to the sawyer attending such sawing machine. To render compact and convenient arrangement of the pedals practicable, the three pedals 73, 95 and 96 are advisably carried by three concentric shafts the outer two of which are, and all of which may be of tubular form. The pedal 73 nearest the sawyer is carried by the central shaft, the intermediate pedal 95 by the intermediate shaft, and the more remote pedal 96 by the outermost shaft, as indicated in Fig. 3. This arrangement not only saves space and lessens cluttering up the floor with separate shafts, but by reason of the mutual support which they afford, permits the use of lighter shafts than would otherwise be practicable.

As mentioned, the husks or frames of the saws or sawing machines 8 and 9 with their saws and attendant parts, are bodily adjustable at right angles to the length of the feeding beds or runways and to the travel of the cants thereover. Any suitable mode of constructing the guideways and bearings of the husk and its supporting bed or base may of course be adopted, but it is found expedient to employ roller bearings of some type to facilitate the manual shifting of the sawing machine frame or husk, though of course power may be employed for this, as herein set forth, in connection with other parts.

Under the construction above explained, the cants are placed upon the skids 35, and advanced by the carrying chains 37 until the foremost one is arrested by the stop and trip chains 51, and in turn arrests those behind it. By actuating the trip chains 51 the foremost cant is delivered upon the horizontal feed rolls 4, where it is positioned by the cant-turner 61 or 61ª, and threaded drum 85, which latter coacting with the feed rolls 3 and 4, delivers the cant within the field of action of spiked or toothed drum 100, the feed rolls and drums thereafter rapidly advancing the cant to and past the previously adjusted saw or saws of the associated sawing machine 8 or 9. As the sawing by this machine is completed, the sawed lumber is removed, and the skid extensions beneath the delivery rolls and at the opposite ends of the skids, being elevated, the cant is lifted from said rolls and transferred to the skids, or if they be clear, to the infeeding rolls of the opposite mill. If another cant or other cants be upon the skids, the foremost one is released by actuation of the trip chains at the discharge ends of said skids, and the above described operations are repeated with the second feeding bed and sawing machine, and this cycle of operations is continued as long as desired. The character of the beams, planks, boards or other timbers produced may be varied at will by appropriate adjustment of the saws and manipulation or control of the cant turning and positioning devices. The quantity and variety of lumber thus producible with the aid of a limited number of attendants and with the expenditure of relatively small amount of power, exceeds anything hitherto possible by any analogous organization of which I am aware.

It is obvious that the sprocket wheels or pulleys 80, 81 of the cant-turner shown in Figs. 9 and 10 may be omitted, the chain in such event riding over the bolts or pins which constitute their axles, but their use is advisable because of the easier action resulting. Such mere omission would not take the structure outside the scope of my invention. Similarly, other types of motors may be employed and various other details may be varied, within the skill and calling of mechanics familiar with this art, without departing from the spirit of my invention and claims.

Having thus described my invention, what I claim is—

1. A resawing organization, comprising in combination two sawing machines, with cant-feeding mechanism for each; intermediate means for delivering the cants from the discharge side of one of said sawing machines to the receiving side of the other of said machines; and means operable from a common point for controlling said cant-feeding and cant-delivery mechanism.

2. A resawing organization, comprising in combination two sawing machines; a feeding bed and feeding devices for each such machine; intermediate skids or cant supports between the feeding beds, of dimensions to hold a plurality of cants; stop devices adapted to prevent the delivery of cants from the skids until brought into operation by an attendant, and then to release and discharge the foremost cant of the series; and controlling devices for the cant-feeding and cant-delivery mechanisms, both operable from a single sawyer's position.

3. In a resawing organization, a cant supporting and feeding bed, provided with a series of upright rolls; means for pressing a cant against said rolls; means for moving the cant longitudinally; and a saw bodily movable in a path intersecting that of the cant, whereby its relation to the upright rolls may be varied and the consequent thickness of the sawed lumber may be determined.

4. A resawing organization, comprising in combination two sawing machines; cant-feeding mechanism for each of said sawing machines; means intermediate the two cant-feeding mechanisms for delivering the cants from the discharge side of one of said sawing machines to the receiving side of the other of said machines; means for turning the cants to present them properly to the respective saws; and control devices for the cant-feeding, cant delivery, and cant-turning mechanisms, all operable from a common point.

5. In combination with upright and horizontal rolls constituting a feeding bed, a cant-turner consisting of a pivoted L-shaped lever, having one arm extending between and normally lying below the tops of the horizontal rolls, means connected with said lever and serving to swing its horizontal arm upward and toward the upright rolls, a power-driven threaded roll pivotally mounted above the horizontal feed rolls and movable toward and from the same; and means for pressing said roll against a cant while the same is lifted by the cant-turner.

6. In combination with a feeding bed comprising upright and horizontal rolls and means for rotating them; a cant-turner, comprising an angular lever having one arm between and normally below the tops of proximate horizontal rolls, and provided near its free end with a wheel or pulley; a second wheel or pulley concentric with the pivot axis of the lever; a chain, secured at one end to a fixed support and passing thence to and over said wheels or pulleys and depending from the inner one; a tooth or spur carried by the depending stretch of the chain; a weight secured to the lower end of the chain and serving to maintain the same in a taut condition; and means for swinging the lever about its pivot.

7. In combination with a saw and with a runway for feeding cants or logs thereto comprising two series of feed rolls arranged with their axes in intersecting planes; means for positively rotating said rolls in feeding direction; a movable pressure-roll; and power-actuated devices for urging said pressure-roll toward the feed-rolls of both series simultaneously, whereby a cant or log section may be pressed into the angle formed by rolls of the two series, held against said rolls, and properly advanced and guided to and past the saw.

8. In combination with cant-feeding beds having two moving surfaces in angular relation, a pressure roll having a coarse screw thread or helix on its periphery, and movable toward said moving surface.

9. In combination with cant-feeding rolls, and means for rotating them, a peripherally threaded pressure and cant-turning roll; a swinging support for said roll; means for swinging said support to carry the roll toward and from the feeding rolls; and means for rotating said threaded roll.

10. In combination with a saw, cant-feeding rolls and means for rotating them; a swinging carrier; a pressure roller carried thereby and provided with a gear wheel; a second gear wheel concentric with the pivot axis of the swinging carrier; means for swinging the carrier about its pivot and maintaining an elastic pressure of the pressure roll against a cant; and means for rotating the second-named gear wheel.

11. In combination with a feeding bed, skids or cant supports arranged at an angle thereto; means for moving cants from said supports to the feeding bed; and a combined stop and trip device for the cant, comprising a wheel located near the delivery end of one of the skids, a chain passing over said wheel and provided with spurs or teeth which project above the skids, a lever to which the ends of the chain are attached on opposite sides of its fulcrum, and means for rocking said lever on its fulcrum.

12. In combination with a saw mill having a feeding bed, a lever for shifting the saw relatively to said bed, a cant skid, means for delivering cants from the skid to the bed, a stop and trip for holding and releasing the cants, cant-turners and pressure rolls; motors for actuating the stop and trip device, cant turner and pressure rolls; and controlling devices for the several motors grouped in proximity to the sawyer's stand and the saw-shifting lever, whereby all may be controlled from one point.

In testimony whereof I have signed my name to this specification.

EDWARD E. FITZGERALD.

Copies of this patent may be obtained for five cents each, by addressing the "Commissioner of Patents. Washington, D. C."